US011915344B2

United States Patent
Yonetsuji

(10) Patent No.: US 11,915,344 B2
(45) Date of Patent: Feb. 27, 2024

(54) METHOD AND APPARATUS FOR AUTOMATIC LINE DRAWING COLORING AND GRAPHICAL USER INTERFACE THEREOF

(71) Applicant: Preferred Networks, Inc., Tokyo (JP)

(72) Inventor: Taizan Yonetsuji, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 0 days.

(21) Appl. No.: 17/239,278

(22) Filed: Apr. 23, 2021

(65) Prior Publication Data
US 2021/0241503 A1    Aug. 5, 2021

Related U.S. Application Data

(63) Continuation of application No. 15/986,138, filed on May 22, 2018, now Pat. No. 11,010,932.

(30) Foreign Application Priority Data

May 23, 2017   (JP) .................................. 2017-102187

(51) Int. Cl.
*G06T 9/00*    (2006.01)
*G06T 11/20*   (2006.01)
(Continued)

(52) U.S. Cl.
CPC .............. *G06T 11/001* (2013.01); *G06T 7/90* (2017.01); *G06T 9/002* (2013.01); *G06T 11/20* (2013.01); *G06T 2200/24* (2013.01); *G06T 2207/10024* (2013.01); *G06T 2207/20084* (2013.01); *G06T 2207/20092* (2013.01)

(58) Field of Classification Search
None
See application file for complete search history.

(56) References Cited

U.S. PATENT DOCUMENTS 5,168,352 A *  12/1992  Naka ........................ H04N 9/43
                                                  348/34
9,058,765 B1 *  6/2015  Mallick .............. G06Q 30/0256
(Continued)

FOREIGN PATENT DOCUMENTS

EP      1 770 641 A1     4/2007
JP      H11-110577 A     4/1999
(Continued)

OTHER PUBLICATIONS

"Creations Vol. 03," MdN, vol. 234, pp. 82-87 (Oct. 2013) Japan, Kabushiki Kaisha MdN Corporation.
(Continued)

*Primary Examiner* — James A Thompson
(74) *Attorney, Agent, or Firm* — Foley & Lardner LLP

(57) ABSTRACT

An apparatus and a method for coloring line drawing is disclosed for: acquiring line drawing data; performing reduction processing on the line drawing data to be a predetermined reduced size to obtain reduced line drawing data; coloring the reduced line drawing data based on a first learned model which is learned in advance using sample data; and coloring original line drawing data with the colored reduced data and the original line drawing data as inputs based on a second learned model which is learned in advance.

66 Claims, 5 Drawing Sheets

(51) Int. Cl.
    *G06T 7/90*    (2017.01)
    *G06T 11/00*   (2006.01)

(56) References Cited

U.S. PATENT DOCUMENTS

| | | | |
|---|---|---|---|
| 9,990,734 | B2 | 6/2018 | Abreu et al. |
| 2002/0106121 | A1 | 8/2002 | McClanahan |
| 2008/0267494 | A1 | 10/2008 | Cohen et al. |
| 2015/0310305 | A1 | 10/2015 | Fang et al. |
| 2016/0196665 | A1 | 7/2016 | Abreu et al. |
| 2016/0232425 | A1 | 8/2016 | Huang et al. |
| 2018/0068463 | A1 | 3/2018 | Risser |
| 2018/0128734 | A1 | 5/2018 | Ikuyama |
| 2018/0150947 | A1 | 5/2018 | Lu et al. |
| 2018/0342084 | A1 | 11/2018 | Yonetsuji |
| 2019/0147361 | A1 | 5/2019 | Matsumoto et al. |
| 2020/0013205 | A1 | 1/2020 | Kavidayal et al. |
| 2020/0098144 | A1 | 3/2020 | Norouzi et al. |
| 2020/0118305 | A1 | 4/2020 | Yonetsuji et al. |

FOREIGN PATENT DOCUMENTS

| | | |
|---|---|---|
| JP | 2012-119968 A | 6/2012 |
| WO | WO-2016/190129 A1 | 12/2016 |

OTHER PUBLICATIONS

Japanese Office Action dated Apr. 12, 2022, in Japanese Application No. 2017-102187.
Kazuaki Suzuki et al., "Drawing Binary Contour Lines and Coloring Surfaces for Pixel Art", Visual Computing, Jun. 22, 2006, pp. 195-200.
Notice of Allowance dated Jun. 10, 2021 in U.S. Appl. No. 16/609,709 (US 2020-0118305).
Notice of Allowance dated Jan. 14, 2021, in U.S. Appl. No. 15/986,138 (US 2018-0342084).
Office Action dated Jul. 2, 2020, in U.S. Appl. No. 15/986,138 (US 2018-0342084).
"Paints Chainer was introduced into a Windows 10 ," [online], (Mar. 24, 2017) https://www.ka-net.org/blog/?p=8171.
@Ikeyasu, "Learning new data with Paints Chainer" [online], (Submitted on Feb. 18, 2017, updated on Apr. 4, 2017) https://quita.com/ikeyasu/items/6c1ebed07b281281b1f6.
U.S. Appl. No. 16/609,709, filed Oct. 30, 2019, Taizan Yonetsuji.
Chen et al., "Image colourisation using linear neighbourhood propagation and weighted smoothing," IET Image Processing, vol. 11 Iss. 5, pp. 285-291 (Mar. 24, 2017).
Notice of Allowance dated Oct. 16, 2020, in U.S. Appl. No. 15/986,138 (US 2018-0342084).
Office Action dated Jun. 11, 2019 in U.S. Appl. No. 15/986,138 (US 2018-0342084).
Office Action dated Mar. 23, 2020, in U.S. Appl. No. 15/986,138 (US 2018-0342084).
Office Action dated Nov. 7, 2019 in U.S. Appl. No. 15/986,138 (US 2018-0342084).
Iizuka et al., "Let there be Color !: Joint End-to-end Learning of Global and Local Image Priors for Automatic Image Colorization with Simultaneous Classification," SIGGRAPH (2016), Available on the Internet <URL: http://hi.cs.waseda.ac.jp/~iizuka/projects/colorization/ja/>.
Mizoroki, "# PaintsChainer Artificial intelligence to color illustration was amazingly created by a 29-year-old," Buzz Feed NEWS (Feb. 5, 2017), Available on the Internet <URL: https://www.buzzfeed.com/jp/sakimizoroki/paintschainer?utm_term=.kIZbBwYWm#.ch7Avp028>.
Okada, "PaintsChainer who caused a big whirlwind the back side told by the author and real story of AI," BITA DigimaLabo (Mar. 3, 2017), Available on the Internet: <URL: https://bita.jp/dml/paints_chainer>.

Pixiv, "Pictorial communication application "pixiv Sketch" and line drawing automatic coloring service "PaintsChainer" cooperate. We start offering automatic coloring function of Illustration!," Pixiv (May 24, 2017), Available on the Internet <URL: https://www.pixiv.net/info.php?id=4043>.
Preferred Networks, Inc., "PaintsChainer," (Jan. 27, 2017), Available on the Internet <URL: http://paintschainer.preferred.tech/>.
Preferred Networks, Inc., "pfnrt/PaintsChainer: line drawing colorization using chainer," github (Jan. 27, 2017), Available on the Internet <URL: https://github.com/pfnet/PaintsChainer>.
Preferred Networks, Inc., "Pictorial communication application "pixiv Sketch" and line drawing automatic coloring service "PaintsChainer" cooperate. We start offering automatic coloring function of illustration!," (May 24, 2017), Available on the Internet <URL: https://www.preferrednetworks.jp/ja/news/pr20170524>.
Sangkloy et al., "Scribbler: Controlling Deep Image Synthesis with Sketch and Color," arXiv (Dec. 5, 2016), Available on the Internet <URL: https://arxiv.org/pdf/1612.00 835.pdf>.
US Student, "Deepcolor," (Mar. 1, 2017), Available on the Internet <URL: http://web.archive.org/web/20170404081215/http:/color.kvfrans.com/>.
Yonetsuji, "Chainer Meetup #04," Youtube 4:01—(Feb. 23, 2017), Available on the Internet <URL: https://www.youtube.com/watch?v=Fq5ZQ1ccG38>.
Yonetsuji, "PaintsChainer," SlideShare, (Mar. 22, 2017), Available on the Internet <URL: https://www.slideshare.net/taizanyonetuji/chainer-meetup-73457448>.
Yonetsuji, "Published line drawing coloring web service," Qiita (Jan. 1, 2017), Available on the Internet <URL: http://qiita.com/taizan/items/7119e16064cc11500f32>.
Yonetsuji, "Using Chainer to colors ketches yields surprising results," Qiita (Dec. 25, 2016), Available on the Internet <URL:http://qiita.com/taizan/items/cf77fd37ec3a0bef5d9d>.
Iizuka et al., "Neural Network-based Automatic Image Colorization,"(Oct. 22, 2018), Available on the Internet: <URL: http://hi.cs.waseda.ac.jp:8082/>.
"Automatic Colorization" https://tinyclouds.org/colorize/ (Jan. 2016).
Office Action dated Nov. 13, 2020, in U.S. Appl. No. 16/609,709 (US 2020-0118305).
Yu et al., "Computational efficiency improvements for image colorization," Proceedings vol. 9020, Computational Imaging XII (Mar. 2014).
Taizan, "Using Chainer to color sketches yields surprising results," Qiita, <URL: https://zhuanlan.zhihu.com/p/24712438> retrieved on Dec. 10, 2020 (document has Jan. 2017 in contents) (translation is found at website listed in C8 below).
Taizan, "Using Chainer to color sketches yields surprising results," Qiita, <URL: https://qiita.com/jerryli27/items/f526a7d5b69ae758a3a6> retrieved on Dec. 10, 2020 (document has Jan. 2017 in contents).
Ayumin(APPBANK), "An Artificial Intelligence that Automatically Colors Line Paintings, is Too Fantastic", [online], May 22, 2017, https://www.appbank.net/2017/05/22/iphone-application/1347507.php.
Ibispaint, "Auto Paint (English version)",youtube [online][video], especially from 0:18 to 0:49, May 22, 2017, https://www.youtube.com/watch?v=YjCsASiOGmU.
Ibispaint, "Auto Paint (Japanese version)",youtube [online][video], especially from 0:18 to 0:49, May 22, 2017, https://www.youtube.com/watch?v=Xh6PRX3usnk.
Kataoka et al., "Automatic Coloring of Manga Images Using Hostile Networks in Deep Learning", IPSJ SIG Technical Report, vol. 2017-CVIM-206 No. 6, pp. 1-6, Mar. 9, 2017.
Shirayama, "Coloring of Monochrome Images", ImageLab, vol. 17-2, pp. 20-24, Feb. 2006.
Notice of Allowance dated Mar. 26, 2021, in U.S. Appl. No. 16/609,709 (US 2020-0118305).

* cited by examiner

METHOD AND APPARATUS FOR AUTOMATIC LINE DRAWING COLORING AND GRAPHICAL USER INTERFACE THEREOF

CROSS-REFERENCE TO RELATED APPLICATIONS

This application is a continuation of U.S. application Ser. No. 15/986,138, filed May 22, 2018, and claims the benefit and priority to Japanese application number JP2017-102187 filed May 23, 2017, the disclosure of which is incorporated in its entirety by reference herein.

TECHNICAL FIELD

The present disclosure relates to a method and an apparatus for automatic line drawing coloring, and a graphical user interface (GUI) for automatically coloring line drawing images.

BACKGROUND

In recent years, a machine learning technology using a multilayered neural network (also referred to as deep network), called deep learning, has been applied to various technology fields. In particular, the utilization thereof stands out in the field of image processing such as image recognition and image generation, and has achieved remarkable results.

For example, a technology described in an article titled "Let there be Color!: Joint End-to-end Learning of Global and Local Image Priors for Automatic Image Colorization with Simultaneous Classification" by Satoshi Iizuka, Edgar Simo-Serra and Hiroshi Ishikawa (http://hi.cs.waseda.ac.jp!/~iizuka/projects/colorization/ja/) realizes processing of automatic colorization of black-and-white photographs by a deep network. The coloring processing on the black-and-white photographs is realized by machine learning.

SUMMARY

There is a demand for automatically coloring line drawing images. Conventionally, there has been software provided with a functionality of coloring a closed region within an image with a selected color. However, regions in hand-drawn line drawing images and the like are often not closed, and the conventional software cannot have easily colored the regions.

Moreover, in the case of the black-and-white photographs of the aforementioned "Let there be Color: Joint End-to-end Learning of Global and Local Image Priors for Automatic Image Colorization with Simultaneous Classification," each dot includes luminance information and the processing determines the color of each dot by using the luminance information as a hint. However, in contrast, a line drawing image does not include luminance information and is more difficult for color processing.

The present disclosure describes a technology made in light of the above problems, and it is an object of the technology of the present disclosure to provide an automatic line drawing coloring method, an automatic line drawing coloring apparatus, and a graphical user interface method which can automatically color line drawing images.

An automatic line drawing coloring method according to the present disclosure is an automatic line drawing coloring method for causing a computer to realize processing for automatically coloring line drawing data and causes the computer, which includes a storage means for storing a plurality of first learned models obtained by learning in advance coloring processing on the line drawing data with a predetermined reduced size based on each of a plurality of sample data groups in which sample data are at least partially different from each other and included in the plurality of sample data groups each constituted by the plurality of sample data including the line drawing data and a plurality of second learned models obtained by learning in advance coloring processing on the sample data with the plurality of sample data groups and a plurality of colored reduced sample data groups each constituted by a plurality of colored reduced sample data obtained by performing the coloring processing on each of the sample data constituting the plurality of the sample data groups in any one of the plurality of first learned models as inputs, to realize a line drawing data acquisition function of acquiring coloring target line drawing data; a reduction processing function of performing reduction processing on the acquired line drawing data to be a predetermined reduced size to obtain reduced line drawing data; a first coloring processing function of performing coloring processing on the reduced line drawing data based on any one first learned model of the plurality of first learned models; and a second coloring processing function of performing coloring processing on original line drawing data with the colored reduced data obtained by performing the coloring processing on the reduced line drawing data by the first coloring processing function and the original line drawing data as inputs based on any one second learned model of the plurality of second learned models.

Moreover, in the automatic line drawing coloring method according to the present disclosure, the first learned model used in the first coloring processing function and the second learned model used in the second coloring processing function are each learned based on the sample data groups constituted by sample data common by a predetermined ratio or more.

Furthermore, in the automatic line drawing coloring method according to the present disclosure, the first learned model used in the first coloring processing function and/or the second learned model used in the second coloring processing function is/are selected and determined by a user from the plurality of first learned models and/or the plurality of second learned models.

Further, the automatic line drawing coloring method according to the present disclosure causes the computer to realize a synthesis function of acquiring one colored data obtained by performing the coloring processing on the original line drawing data based on the first coloring processing function and the second coloring processing function and at least one other colored data obtained by performing the coloring processing on the original line drawing data based on the first coloring processing function and the second coloring processing function by using a first learned model different from the one used for the coloring processing to obtain the one colored data and/or a second learned model different from the one used for the coloring processing to obtain the one colored data, synthesizing the one colored data and the other colored data, and outputting synthesized colored data.

Still further, in the automatic line drawing coloring method according to the present disclosure, the synthesis function enables the user to select a synthesis ratio of the one colored data and the other colored data.

Moreover, the automatic line drawing coloring method according to the present disclosure causes the computer to realize a hint information acquisition function of acquiring hint information on coloring the line drawing data with at least one color and realize a function of performing the coloring processing with the reduced line image data and the hint information as inputs in the first coloring processing function.

Furthermore, in the automatic line drawing coloring method according to the present disclosure, the first learned models learned based on the sample data groups including both sample data without a hint including only the line drawing data and sample data with a hint including the line drawing data and the hint information on coloring the line drawing data with at least one color.

An automatic line drawing coloring apparatus according to the present disclosure includes: a storage means for storing a plurality of first learned models obtained by learning in advance coloring processing on line drawing data with a predetermined reduced size based on each of a plurality of sample data groups in which sample data are at least partially different from each other and included in the plurality of sample data groups each constituted by the plurality of sample data including the line drawing data and a plurality of second learned models obtained by learning in advance coloring processing on the sample data with the plurality of sample data groups and a plurality of colored reduced sample data groups each constituted by a plurality of colored reduced sample data obtained by performing the coloring processing on each of the sample data constituting the plurality of the sample data groups in any one of the plurality of first learned models as inputs; a line drawing data acquisition unit which acquires coloring target line drawing data; a reduction processing unit which performs reduction processing on the acquired line drawing data to be a predetermined reduced size to obtain reduced line drawing data; a first coloring processing unit which performs coloring processing on the reduced line drawing data based on any one first learned model of the plurality of first learned models; and a second coloring processing unit which performs coloring processing on original line drawing data with the colored reduced data obtained by performing the coloring processing on the reduced line drawing data by the first coloring processing unit and the original line drawing data as inputs based on any one second learned model of the plurality of second learned models.

A graphical user interface method according to the present disclosure is a graphical user interface method for an automatic line drawing coloring tool provided to a client terminal connected via a communication network from a server apparatus storing the automatic line drawing coloring method and provides a graphical user interface to a display of the client terminal by causing the server apparatus to realize a line drawing data input form display function of displaying, on a display screen, a form region for a user, who operates the client terminal, to input line drawing data, a line drawing image display function of displaying, in a line drawing image display region provided on the display screen, line drawing indicated by the line drawing data inputted, and a colored image display function of displaying, in a colored image display region provided on the display screen, a colored image indicated by colored image data obtained by performing coloring processing on the line drawing data with the automatic line drawing coloring method.

Moreover, the graphical user interface method according to the present disclosure causes the server apparatus to realize a hint information input tool display function of displaying, on the display screen, a hint information input tool for designating a portion which should be colored with a selected color in the line drawing data displayed in the line drawing image display region and accepting input of hint information and a coloring execution button display function of displaying, on the display screen, a coloring execution button for executing the coloring processing in a state in which the hint information is included in a state in which the input of the hint information has been accepted by the hint information input tool display function.

According to the present disclosure, the coloring processing is first performed on the reduced line drawing data obtained by reducing the acquired line drawing data with the original size, and the second coloring processing is performed by using the obtained colored reduced data and the line drawing data with the original size to obtain the colored image. Thus, it is possible to appropriately perform the coloring processing on line drawing data with a large size. Moreover, based on each of the plurality of sample data groups in which the sample data included therein are at least partially different from each other, the plurality of first learned models used for the coloring processing in the first coloring processing and the plurality of second learned models used for the coloring processing in the second coloring processing are learned in advance and stored, and the coloring processes are performed by one of the plurality of first learned models and one of the plurality of second learned models. Thus, it is possible to execute coloring processes with various coloring tendencies. Furthermore, by allowing the user to select any one learned model of the plurality of learned models to be used to execute the coloring processes, the user can select the first learned model and/or the second learned model with the coloring tendency which the user prefers.

Further, by progressing the learning including the hint information on the coloring during the learning process of the first learned models used for the coloring, it is possible to carry out the coloring processing with the hint information on the coloring in the coloring processing on the line drawing data.

Still further, the GUI is provided to the display screen of the display of the client terminal from the server apparatus to provide the automatic line drawing coloring tool to the user by the GUI, and the line drawing image display region and the colored image display region are provided in the same display screen as functions of the GUI. Thus, the user can view the original line drawing data and the colored image parallel so that the atmosphere of the creation that changes before and after the coloring can be compared directly. In addition, the hint information for designating the portion that should be colored with the selected color in the line drawing data displayed in the line drawing image display region can be inputted, and the re-coloring processing can be executed in a state in which the hint information is attached. Thus, the user can execute automatic coloring on the line drawing data by freely giving the coloring hint.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

FIGS. 4A-4B are schematic diagrams showing one example of a display screen of a graphical user interface of the present example, in which FIG. 4A shows a display screen at the time of inputting line drawing data and FIG. 4B shows a display screen after coloring processing on the line drawing data.

DETAILED DESCRIPTION

Figure 1:
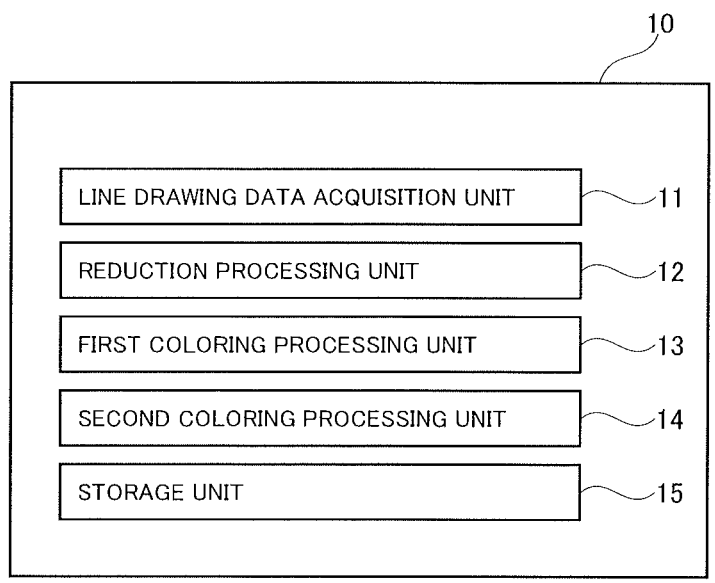
FIG. 1 is a block diagram showing the configuration of an automatic line drawing coloring apparatus according to various embodiments of the present disclosure.

Common reference numerals are used throughout the drawings and the detailed description to indicate the same or similar components. Embodiments of the present disclosure will be readily understood from the following detailed description taken in conjunction with the accompanying drawings.

First Embodiment

Hereinafter, an example of an automatic line drawing coloring apparatus according to a first embodiment is described with reference to the drawings. FIG. 1 is a block diagram showing the configuration of an automatic line drawing coloring apparatus 10 according to various embodiments of the present disclosure. Note that the automatic line drawing coloring apparatus 10 may be an apparatus designed as a dedicated machine, but can be realized by general computers. In this case, the automatic line drawing coloring apparatus 10 includes a central processing unit (CPU), a graphics processing unit (GPU), a memory and a storage unit such as a hard disk drive (not shown), which are included in the general computers. Moreover, it is appreciated by a person having ordinary skill in the art that various processes are executed by methods in order to cause these general computers to function as the automatic line drawing coloring apparatus 10 of the present example.

As shown in FIG. 1, the automatic line drawing coloring apparatus 10 includes, e.g., at least a line drawing data acquisition unit 11, a reduction processing unit 12, a first coloring processing unit 13, a second coloring processing unit 14, and a storage unit 15.

The line drawing data acquisition unit 11 has a function of acquiring coloring target line drawing data. The coloring target line drawing in the present disclosure is not particularly limited, but it is desirable to incorporate the target line drawing into sample data in the learning process of a learning model described later to be learned in advance. There are various line drawings with the different thicknesses of the lines and the different types of touch, and the types of line drawing that can be colored increase by learning based on various line drawing data.

The reduction processing unit 12 has a function of performing reduction processing on the acquired line drawing data to be a predetermined reduced size to obtain reduced line drawing data. The automatic line drawing coloring apparatus 10 of the present example may have a configuration of performing two-step coloring processing, in which the coloring of the line drawing data with the reduced size is performed in the first coloring processing unit 13, and based on that, the coloring of the line drawing data with the original size is performed in the second coloring processing unit 14. Thus, the reduction processing unit 12 first reduces the acquired line drawing data to a predetermined reduced size to be inputted into the first coloring processing unit 13.

The first coloring processing unit 13 has a function of performing the coloring processing on the reduced line drawing data. The coloring processing is performed based on a first learned model which learned in advance the coloring processing on the line drawing data with the reduced size by using sample data (also referred to as training data) constituted by the line drawing data.

The second coloring processing unit 14 has a function of performing the coloring processing on the original line drawing data with the colored reduced data obtained by performing the coloring processing on the reduced line drawing data with the first coloring processing unit 13 and the original line drawing data as inputs. The coloring processing is performed based on a second learned model which learned in advance the coloring processing on the sample data constituted by the line drawing data and the colored reduced sample data obtained by performing the coloring processing on this sample data in the first coloring processing unit 13 as inputs.

The storage unit 15 has a function of storing data for various processes performed in the automatic line drawing coloring apparatus 10, which includes the line drawing data acquisition unit 11, the reduction processing unit 12, the first coloring processing unit 13, the second coloring processing unit 14, and the like, and data obtained as the processing results.

Figure 2:
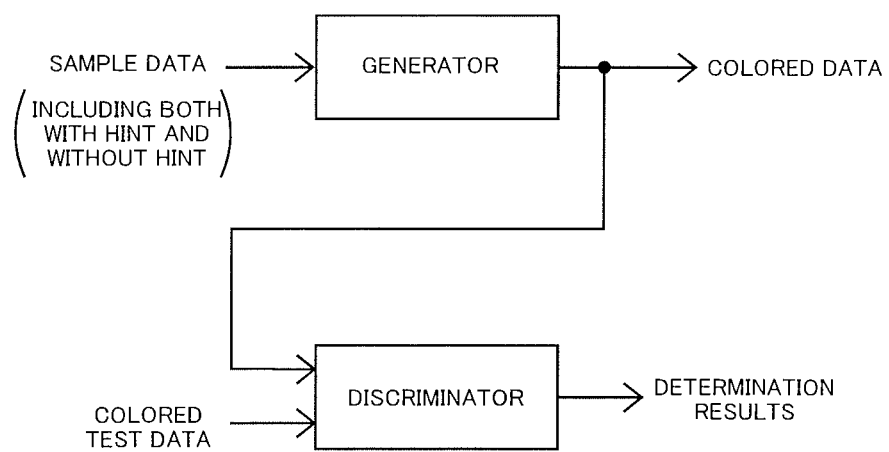
FIG. 2 is a block diagram showing one example of a learning method of a first learned model.

In addition, a learning method of the first learned model used in the first coloring processing unit 13 is described herein. FIG. 2 is a block diagram showing one example of a learning method of the first learned model. A model for learning the first learned model may be any type of machine learning model, but it is preferable to adopt, for example, a generative adversarial model. As shown in FIG. 2, this generative adversarial model is configured with a generator and a discriminator. The generator learns to generate a colored image from sample data which is the line drawing data, and the discriminator learns to discriminate between the colored reduced data generated by the generator and colored test data prepared in advance. The generator learns coloring so as to deceive the discriminator, the discriminator learns to discriminate so as not to be deceived, and both of these learnings progress.

Moreover, the sample data constituted by the line drawing data used for the learning of the generator is learned by both sample data without hint information on the coloring and sample data including hint information on the coloring. Various patterns can be considered for the ratio between the sample data without the hint information and the sample data with the hint information. For example, the sample data without the hint information set to 40% and the sample data with the hint information set to 60% can be considered. Furthermore, the sample data with the hint information is one in which the number of color designations for the coloration as the hint information is set between 1 and 128. Further, it is preferable that, as a way of giving the hint information, various ways of giving the hint information, such as giving coloration designation by one dot, designating coloration by line segments, and designating a predetermined range by filling with a designated color, be performed in advance at the stage of learning so as to be able to deal with various ways of giving the hint information by a user.

Thus, by learning using both the sample data without the hint information and the sample data with the hint information set to a large number of hint information, the first learned model capable of performing the coloring processing with both presence and absence of the hint information can be obtained. Note that the sample data with the predetermined reduced size on the premise that the sample data is reduced in the reduction processing unit 12 is used for the sample data used for the learning of this first learned model.

As for the learning method of the second learned model used in the second coloring processing unit 14, similar to the case of the first learned model, any model may be used for the learning. For example, a generative adversarial model can be adopted. The sample data used for the learning of the second learned model are the colored reduced data generated by the first learned model and the line drawing data (line drawing data with an image size larger than the predetermined reduced size) which is the base of this colored reduced data. Performing the coloring processing on the line drawing data which is the base in the generator is learned with these two data as inputs into the generator. Moreover, the discriminator learns to discriminate between the colored data generated by the generator and the colored test data prepared in advance. The generator learns the coloring processing so as to deceive the discriminator, and the discriminator learns to discriminate so as not to be deceived. By progressing both of these learning processes, the second learned model can be obtained. Note that the learning may be performed after enlargement processing is performed on the colored reduced data used for the learning of the second learned model so as to match the size of the original line drawing data and the data is inputted into the generator.

Note that both the sample data of the line drawing data and the colored test data are for the learnings of the first learned model and the second learned model described above. Then, it is preferable that the line drawing data and the colored test data obtained by performing the coloring processing on this line drawing data are prepared in sets, rather than being completely separated images. Thereupon, the line drawing may be generated from the colored image by using image processing such as edge extraction processing to prepare the line drawing data and the colored image data in sets. At this time, to use as the hint information, the coloring information in the original colored image is extracted as the hint information. Thus, it is possible to also generate the sample data with the hint information.

There is a possibility of encountering issues, such as poor convergence of the learning and enormous operation time for the learning processing, when attempting to learn to perform the coloring processing directly on the line drawing data with a large size. However, as in the present example, when the two-step learning is performed in which the first coloring processing is performed after the reduction to the predetermined reduced size, and the coloring processing is performed on the line drawing data with the original size by using the results of the first coloring processing, it is possible to learn well the coloring processing on the line drawing data with a large size, and the time for the learning processing can be shortened.

Figure 3:
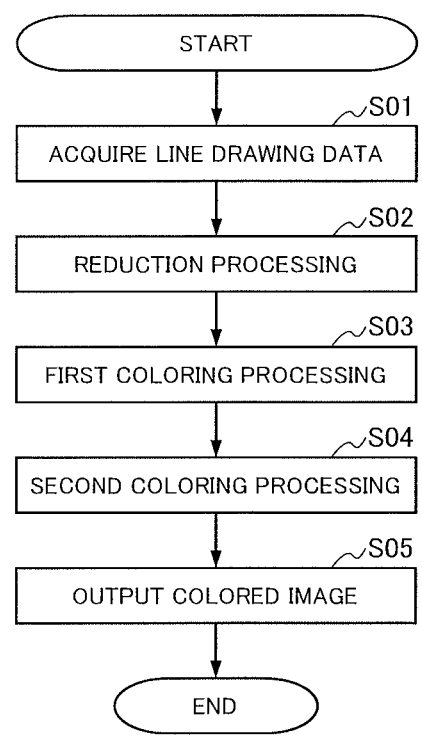
FIG. 3 is a flowchart showing a processing flow performed by the automatic line drawing coloring apparatus illustrated in FIG. 1.

Next, the coloring processing flow in the automatic line drawing coloring apparatus 10 of the present example is described FIG. 3 is a flowchart showing a coloring processing flow in the automatic line drawing coloring apparatus 10 of the present example. The coloring processing in the automatic line drawing coloring apparatus 10 of the present example starts first by acquiring the line drawing data (step S01). For example, the acquisition is performed by a user selecting the line drawing data of the coloring processing target. At this time, the hint information for coloring the line drawing data may also be acquired together along with the acquisition of the line drawing data. The reduction processing is performed on the acquired line drawing data so as to be the predetermined reduced size (step S02). At this time, the line drawing data with the original size is also kept separately.

Next, the first coloring processing is performed on the reduced line drawing data (step S03) The first coloring processing is performed based on the first learned model which learned in advance the coloring processing on the line drawing data with the reduced size. At this time, in the case of including the hint information, the coloring is performed based on the first learned model in a state in which the hint information is attached. As a result of this first coloring processing, the colored reduced data is obtained.

Next, the second coloring processing is performed on the line drawing data with the original size acquired in step S01 (step S04). The second coloring processing is performed based on the second learned model which learned in advance the coloring processing on the line drawing data with the original size by using the colored reduced data. At this time, it is also possible to perform the enlargement processing on the colored reduced data so as to match the size of the original line drawing data and then input the data. The obtained colored data is outputted as a colored image (step SOS), and the coloring processing ends.

As described above, according to the automatic line drawing coloring apparatus 10 of the first embodiment, the coloring processing is first performed on the reduced line drawing data obtained by reducing the acquired line drawing data with the original size, and the second coloring processing is performed by using the obtained colored reduced data and the line drawing data with the original size to obtain the colored image. Thus, it is possible to appropriately perform the coloring processing on the line drawing data with a large size. By progressing the learning including the hint information on the coloring during the learning process of the first learned model used for the coloring processing, it is possible to carry out the coloring processing with the hint information on the coloring in the coloring processing on the line drawing data.

Second Embodiment

Hereinafter, an example of a graphical user interface for providing an automatic line drawing coloring tool according to a second embodiment is described with reference to the drawings. In the first embodiment disclosed above, the automatic line drawing coloring apparatus 10 has been described. However, a technique can be considered, in which an automatic line drawing coloring method is performed in a server apparatus, and an automatic line drawing coloring tool is provided to a user who has accessed the server apparatus from a client terminal via a communication network. In such a case, it is not limited to a case where the automatic line drawing coloring tool is provided to the client terminal by software of a package, and it is also possible to provide the automatic line drawing coloring tool by presenting a graphical user interface (GUI) in a browser or the like displayed on a display of the client terminal.

In the following description, a case where the automatic line drawing coloring method and the first learned model and the second learned model used in the automatic line drawing coloring method are stored in the server apparatus and the automatic line drawing coloring tool is used by accessing the server apparatus from the client terminal via the communication network is described as an example. However, since a similar GUI can be used even when all of these are stored in the client terminal, it is appreciated by a person having ordinary skill in the art that any one of the cases is the subject of the present example.

Figure 4A:
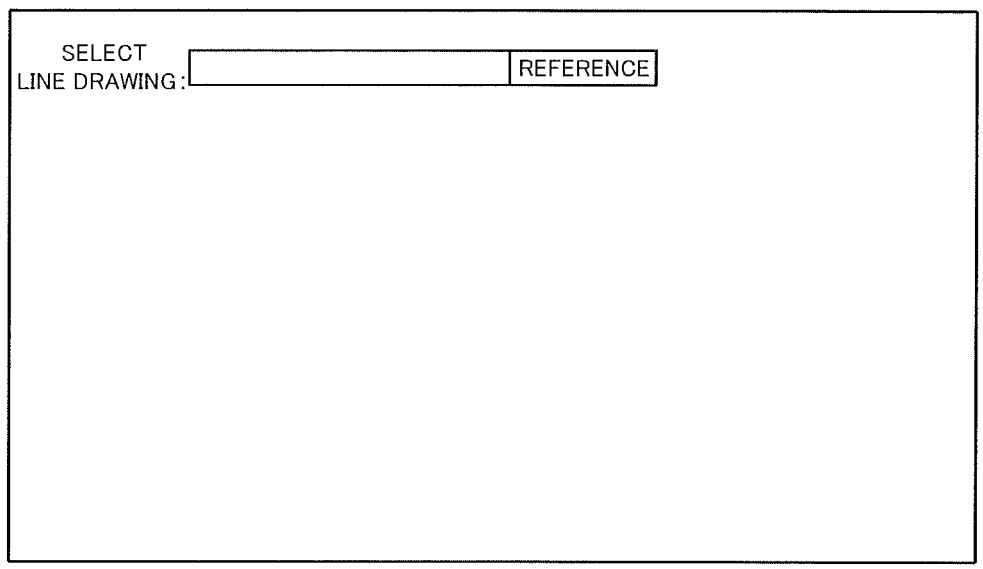
Figure 4B:
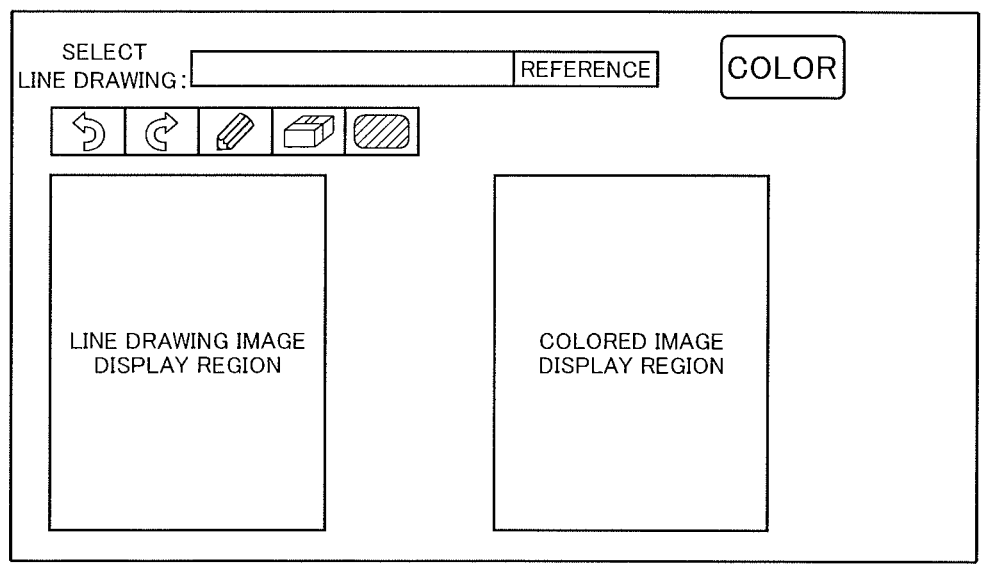

FIGS. 4A and 4B are explanatory diagrams showing one example of a display screen displayed by the graphical user interface of the present example, in which FIG. 4A is a display screen at the time of inputting line drawing data and FIG. 4B is a display screen after coloring processing on the line drawing data. When the automatic line drawing coloring tool is provided to the client terminal from the server apparatus, first, as shown in FIG. 4A, a line drawing data input form, which is a form region for a user to input or select the line drawing data, is displayed on the display of the client terminal, for example, via a Web browser or the like. In this line drawing data input form, the line drawing data is inputted by a method for designating a path of a file in FIG. 4A. However, the input is not limited to this, and, for example, a technique of selecting the line drawing data by drag & drop may be used. Note that the display screen in the present example is a screen displayed to the user when the GUI is provided by the graphical user interface program, a Web browser, or the like and includes a display screen generated by the server apparatus and/or a display screen generated by the client terminal.

When the line drawing data is designated, the coloring processing is automatically started. The selected line drawing data is transmitted to the server apparatus, the coloring processing is performed by the automatic line drawing coloring process executed in the server apparatus, and the colored image data obtained as a result is transmitted to the client terminal. As shown in FIG. 4B, the line drawing indicated by the line drawing data selected by the user is displayed in a line drawing image display region, and the colored image indicated by the colored image data is displayed in a colored image display region. Since the selected line drawing image and the colored image are displayed side by side on the same screen, the user can observe and compare the images before and after the coloring at the same time.

Moreover, as shown in FIG. 4B, in the screen displaying the line drawing image and the colored image, hint information input tools for designating a portion which should be colored with a selected color in the line drawing data displayed in the line drawing image display region are displayed. In the example shown in FIG. 4B, the hint information input tools are "return to previous work", "progress to next work", "select a pen for inputting the hint information", "delete the inputted hint information (eraser)", and "select the color for the coloring", but are not limited to these. For example, a color used for the coloring is selected by a mouse operation, and a portion which should be colored with the selected color in the line drawing image in the line drawing image display region is actually colored by a technique such as adding a dot, adding a line segment, or filling a region by a pointer, thereby providing the hint information. Then, when a coloring execution button displayed on the same screen is clicked by a mouse operation or the like, the coloring processing is executed in a state in which the hint information is included, and the colored image reflecting the hint information is displayed in the colored image display region.

Figure 5:
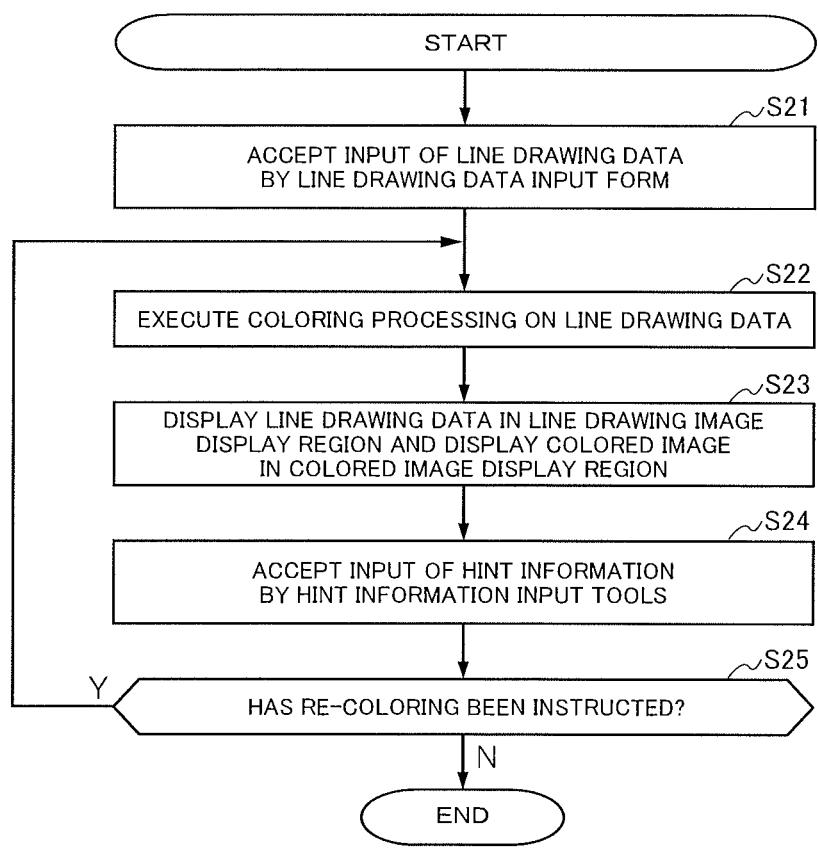
FIG. 5 is a flowchart showing a processing flow in a case where an automatic line drawing coloring process is performed based on the GUI according to a second embodiment.

FIG. 5 is a flowchart showing a processing flow in a case where automatic line drawing coloring tools are provided based on the GUI according to the second embodiment. As shown in FIG. 5, the processing flow in the case where the automatic line drawing coloring tools are provided is started by displaying the line drawing data input form on the display screen of the display of the client terminal from the server apparatus and accepting the input of the line drawing data (step S21). When the line drawing data is inputted by the user, the line drawing data is transmitted to the server apparatus, and the coloring processing is executed on the line drawing data in the server apparatus that has acquired the line drawing data (step S22). The execution of the coloring processing in this step S22 may be the same as, or similar to, the coloring processing flow in the first embodiment described with the flowchart in FIG. 3, and processes the same as, or similar to, those in steps S01 to S05 in FIG. 3 are executed in this step S22.

The colored image data obtained by the coloring processing is transmitted to the client terminal. At the client terminal, the line drawing image indicated by the line drawing data is displayed in the line drawing image display region provided on the display screen, and the colored image indicated by the colored image data is displayed in the colored image display region (step S23). Moreover, the hint information input tools are displayed on the display screen, and the input of the hint information by the hint information input tools is accepted (step S24). The user who wishes to re-color by providing the hint of the coloring provides the hint information on the coloring to the line drawing image displayed in the line drawing image display region. Then, when the re-coloring is instructed by clicking the coloring execution button (step S25-Y), the hint information and the line drawing data are transmitted to the server apparatus, and the re-coloring processing is executed in a state in which the hint information is attached (step S22). The colored image data which is given the hint information and obtained by the re-coloring processing is transmitted to the client terminal, and the colored image indicated by the colored image data given the hint information is displayed in the colored image display region (step S23). In this way, at the stage where the colored image data desired by the user is obtained, no further re-coloring is performed (step S25-N), the process of the automatic line drawing coloring tools ends.

As described above, the GUI is provided to the display screen of the display of the client terminal from the server apparatus to provide the automatic line drawing coloring tools to the user by the GUI, and the line drawing image display region and the colored image display region are provided in the same display screen as functions of the GUI. Thus, the user can view the original line drawing image and the colored image side by side so that the atmosphere of the creation or visual impression that varies before and after the coloring can be compared directly. Moreover, the hint information for designating the portion to be colored with the selected color in the line drawing image indicated by the line drawing data displayed in the line drawing image display region can be inputted, and the re-coloring processing can be executed in a state in which the hint information is attached. Thus, the user can execute automatic coloring on the line drawing image by freely giving the coloring hint. Note that this addition of the hint information may not designate that the place is painted with the designated color, but may cause the learned models to execute the coloring in a state in which the hint information is included. Thus, it can be appreciated that the coloring may not be performed with the designated color. The learnings are performed by including the hint information in the learning processes of the first learned model and the second learned model used by the automatic line drawing coloring method. Thus, it can be appreciated that how the designated hint information is adopted is determined by the sample data and the tendency of the hint information used for the learnings. This is different compared to functions of the coloring processing in conventional image editing software or the like which performs coloring with a designated color.

In the second embodiment, when the line drawing data is inputted by the line drawing data input form on the GUI, the coloring processing is automatically and immediately performed. However, this is an example. Alternatively, when the line drawing data is inputted, the line drawing image indicated by the line drawing data may be displayed in the line drawing image display region, and the hint information may be inputted. Even when the order of processes is changed in this way, such method does not depart from the teachings of the present disclosure.

Third Embodiment

In the first and second embodiments, the coloring processing has been described to be executed by one set of the first learned model and the second learned model. However, the number of sets is not limited to this, and a plurality of sets of first learned models and second learned models may be provided.

In the automatic line drawing coloring apparatus 10 according to the first embodiment, one set of the first learned model and the second learned model has been described to be stored in the storage unit 15. However, in the present example, a plurality of first learned models and a plurality of second learned models, in which the contents of sample data groups used for the learnings are different, are learned in advance and stored in a storage unit 15.

That is, based on each of a plurality of sample data groups in which sample data are at least partially different from each other and included in the plurality of sample data groups each constituted by a plurality of sample data including line drawing data, the plurality of first learned models are obtained by learning in advance coloring processing on the line drawing data with a predetermined reduced size and stored in the storage unit 15. Moreover, the plurality of sample data groups and a plurality of colored reduced sample data groups each constituted by a plurality of colored reduced sample data obtained by performing the coloring processing on each of the sample data constituting the plurality of sample data groups in any one of the plurality of first teamed models serve as inputs, and the plurality of second learned models are obtained by learning in advance the coloring processing on the sample data and stored in the storage unit 15.

Preferably, the first learned model and the second learned model, which are learned based on the sample data groups constituted by sample data common by a predetermined ratio or more, are stored as one learned model set so that the correspondence relationship therebetween can be appreciated. Moreover, the first learned model and the second learned model stored in pair as one learned model set are preferably used for the coloring processing in the first coloring processing unit 13 and the coloring processing in the second coloring processing unit 14 to obtain one colored data. By making the first learned model and the second learned model each learn based on the sample data groups in which the sample data overlap at the predetermined ratio or more, the coloring processing in the first coloring processing unit 13 and the coloring processing in the second coloring processing unit 14 become coloring processes common in tendency. Thus, the quality of the obtained colored data is improved.

Then, a learned model set including one pair of the first learned model and the second learned model is made to learn a plurality of learned model sets so that the coloring tendencies are made different, and stored in the storage unit 15. The existence of the plurality of learned model sets with different coloring tendencies has the effect of obtaining colored data with various coloring tendencies. Furthermore, by allowing the user to select any one learned model set from the plurality of learned models sets to be used to execute the coloring processing, the user can select the first learned model and the second learned model with the coloring tendency which the user prefers. Note that it is appreciated by a person having ordinary skill in the art that the storage unit 15 described in the first to third embodiments may be the storage unit 15 provided inside the automatic line drawing coloring apparatus 10 or may be a storage means for causing the server apparatus, which can be connected via the communication network, to store data, instead of providing the storage unit 15 inside.

Further, when two or more colored data are obtained from each learned model set by using two or more learned model sets with different coloring tendencies, a synthesis unit for synthesizing these two or more colored data to obtain one synthesized colored data may be provided. That is, the synthesis unit has functions of acquiring one colored data obtained by performing the coloring processing on the original drawing data based on the first coloring processing unit 13 and the second coloring processing unit 14 and at least one other colored data obtained by performing the coloring processing on the original line drawing data based on the first coloring processing unit 13 and the second coloring processing unit 14 by using the first learned model different from the one used for the coloring processing on the one colored data and/or the second learned model different from the one used for the coloring processing on the one colored data, synthesizing the one colored data and the other colored data, and outputting the synthesized colored data.

This synthesis processing in the synthesis unit may be any synthesis processing as long as two or more images can be synthesized. For example, an image synthesis technique generally performed by addition, subtraction, multiplication, and division can be directly adopted. Moreover, at this time, the user can designate the synthesis ratio of each data when synthesizing two or more colored data. For example, to synthesize two colored data, the configuration may be such that the synthesis ratio of one colored data can be adjusted between 0% and 100% by a seek bar, a display image based on the synthesized colored data at each ratio under adjustment is displayed on the display, and the user can visually recognize the change in the display image based on the synthesized colored data due to the change in the synthesis ratio.

As described above, according to the automatic line drawing coloring apparatus 10 of the third embodiment, the plurality of learned model sets are learned and stored in the storage unit 15. Thus, there is an effect of obtaining colored data with various coloring tendencies based on the plurality of learned model sets with different coloring tendencies. Furthermore, by allowing the user to select any one learned model set from the plurality of learned models sets to be used to execute the coloring processing, the user can select the first learned model and the second learned model with the coloring tendency which the user prefers. Further, by including the synthesis unit which synthesizes two or more obtained colored data, it is possible to obtain the synthesized colored data obtained by synthesizing colored data with different coloring tendencies. Thus, it is possible to obtain the colored image with the coloring tendency which cannot be obtained by single colored data.

Note that the learned model set including the first leaned model and the second model, which are learned based on the sample data groups constituted by the sample data common by the predetermined ratio or more, has been described to be preferred to be used in one pair in the third embodiment, but is not limited to this. That is, the user may independently select the first learned model used in the first coloring processing unit 13 and the second learned model used in the second coloring processing unit 14. It is also possible to select the first learned model and the second learned model in which completely different sample data groups are used for the learnings. When such selection is possible, high quality coloring processing is not necessarily possible. However, it can be appreciated that such selection has an effect that user can enjoy automatic coloring processing with various combinations and an effect that there is a possibility that the coloring results, which cannot be obtained when the common sample data groups are used, can be obtained.

Fourth Embodiment

In the second embodiment, the graphical user interface has been described to be provided as a Web service. However, an automatic coloring method according to the present disclosure can be incorporated into drawing creation software, image editing software, a Web service (hereinafter also referred to as editing software or the like) which provides the functions equivalent to these pieces of software to the client terminal from the server apparatus, and the like.

The editing software including the drawing creation software and the image editing software may have a function of creating line drawing data and a function of pasting line drawing data. Then, it can be said that a general configuration is such that the creation of the line drawing data and the pasting of the line drawing data are managed by a plurality of layers, and the line drawing data is created and pasted in a specific layer. Moreover, in the editing software, there are functions of forming a closed region in a layer and performing specific processing only in that region, such as a filling function, a hatching processing function, and the like. By incorporating the automatic coloring method according to the present disclosure into the editing software having such a configuration and functions, it is possible to provide more multifunctional editing software.

For example, it can be considered that coloring processing on the line drawing data created and the line drawing data pasted based on the functions of the editing software can be executed by the automatic coloring method. With such a configuration, it is possible to execute the coloring processing on the line drawing data created by the editing software and the line drawing data taken into the editing software, and further, the colored data obtained based on various functions of the editing software can be further edited.

Moreover, it can be considered that the coloring processing can be executed by the automatic coloring method only for a specific layer by using the function of managing by the plurality of layers in the editing software. By using such a function, application is possible such that line drawing data is written on different layers for each part, the coloring processing is executed on a part basis, and edited image data with all the layers superimposed is obtained at last. For example, application is possible such that a layer relating to line drawing data of a person and a layer relating to line drawing data of a background are provided and superimposed after the coloring processing is performed on both of the layers, thereby obtaining one image data at last. At this time, if a learned model set specialized in coloring the person is selected to color the layer relating to the line drawing data of the person and a learned model set specialized in coloring the background is selected to color the layer relating to the line drawing data of the background so as to obtain one image data at last as in the third embodiment, there is a possibility that high quality colored data is obtained as compared with a case where the coloring processing is carried out on the entire line drawing data including the person and the background from the beginning.

Moreover, it can be considered that, by using functions of forming a closed region in a layer and performing specific processing only on that region, the coloring processing can be executed only on the closed region in the layer by the automatic coloring method. If an image drawn in the closed region is regarded as one line drawing data, the coloring processing can be applied without particular technical difficulties. With such a function, it is possible to execute the coloring processing only on the region selected by the user.

As described above, by applying the automatic coloring method according to the present disclosure to the existing editing software, the colored image indicated by the colored data obtained by performing the automatic coloring can be further edited based on the editing software, and the automatic coloring can be executed on layer basis or closed region basis in the layer. Thus, it is possible to provide editing software with the automatic coloring function in which the user's convenience is more improved. It can be said that there is a possibility that such editing software with the automatic coloring function contributes to improving the efficiency of the work as a whole by making some coloring work executed based on the automatic coloring method at production sites of computer graphics and animation.

In the first to fourth embodiments, the configuration is such that the line drawing data is reduced to the predetermined reduced size, the first coloring processing is executed in the first coloring processing unit, and the second coloring processing is executed in the second coloring processing unit by using the colored reduced data obtained as a result and the line drawing data with the original size. This is performed to appropriately perform the coloring processing on the line drawing data with a large size. The processing is performed by dividing into two steps in the present example, but is not limited to this. The coloring may be performed by dividing the processing into three or more steps.

Moreover, the coloring processing is not limited to the case of dividing into a plurality of steps. The configuration may be such that the coloring processing on the line drawing data is completed by one step as long as the coloring processing can be appropriately executed on the line drawing data with a large size. In this case, the configuration is to output the colored data by one step based on a learned model learned, based on sample data groups, to directly carry out coloring processing on line drawing data with an original size without being reduced. It is within the scope of teachings of the present disclosure even with a combination of such a configuration with the coloring processing unit of one step and the aforementioned configurations of the first to fourth embodiments.

It is appreciated by a person having ordinary skill in the art that the contents described in the first to fourth embodiments do not necessarily function in each of the embodiments and combinations of various configurations described in the specification are also included in the scope of teachings of the present disclosure.

Amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A colorization apparatus comprising:
   at least one memory; and
   at least one processor configured to:
   manage a plurality of layers including one or more images;
   perform an automatic colorization with respect to at least a first layer that is selected by a user, as a selected layer at least a portion of which is to be subject to the automatic colorization colorizing at least a portion of an image in the selected layer even without color information for at least the portion of the image in the selected layer, from among the managed plurality of layers;
   synthesize at least a resultant layer of the automatic colorization and a second layer that is among the managed plurality of layers and is not subject to the automatic colorization, into a synthesized colored image; and
   display the synthesized colored image on a display device.

2. The colorization apparatus according to claim 1, wherein the resultant layer of the automatic colorization includes a portion that has been colorized and a portion that has not been colorized.

3. The colorization apparatus according to claim 1, wherein the at least one processor is configured to:
   display, on the display device, a user interface for allowing the user to give hint information about the automatic colorization for the first layer selected by the user, and
   perform the automatic colorization with respect to the first layer selected by the user, based on the hint information given by the user through the user interface.

4. The colorization apparatus according to claim 3, wherein the hint information is information that provides correspondence between a color selected by the user and a portion that is designated by the user as a portion to be colorized with the selected color, with respect to the first layer selected by the user.

5. The colorization apparatus according to claim 4, wherein the user interface establishes the correspondence by allowing the user to place a dot on the portion to be colorized with the selected color.

6. The colorization apparatus according to claim 1, wherein the at least one processor is configured to:
   perform the automatic colorization by performing an automatic colorization with respect to a user selected region; and
   refrain from performing an automatic colorization with respect to other regions, in the first layer selected by the user.

7. The colorization apparatus according to claim 1, wherein the managed plurality of layers include a background layer, and the first layer selected by the user is a layer superimposed on the background layer.

8. The colorization apparatus according to claim 7, wherein the layer superimposed on the background layer is a layer of a person.

9. The colorization apparatus according to claim 1, wherein the at least one processor is configured to perform another automatic colorization with respect to the second layer in addition to the first layer selected by the user.

10. The colorization apparatus according to claim 9, wherein the at least one processor is configured to synthesize at least resultant layers of the automatic colorization and the second layer of the another automatic colorization into the synthesized colored image.

11. The colorization apparatus according to claim 1, wherein the at least one processor is configured to perform the automatic colorization based on a colorization model.

12. The colorization apparatus according to claim 11, wherein the colorization model includes a neural network.

13. The coloring apparatus according to claim 1, wherein the at least one processor is configured to receive a color and a position for target image data of the first layer selected by the user, the color and the position for the target image data being selected by the user as a hint for the automatic colorization of the target image data.

14. The colorization apparatus according to claim 1, wherein the at least one processor is further configured to:
   perform a second automatic colorization with respect to at least the second layer that is selected by the user, as a second selected layer at least a portion of which is to be subject to the second automatic colorization even without color information for at least the portion of the second selected layer, from among the managed plurality of layers;
   wherein the synthesizing synthesizes at least the resultant layer of the automatic colorization with respect to the first layer and the second layer that is a resultant layer of the second automatic colorization with respect to the second layer, into the synthesized colored image.

15. A method comprising:
  managing a plurality of image layers overlapping each other;
  selecting at least one layer at least a portion of which is to be subject to an automatic colorization colorizing at least a portion of an image in the selected at least one layer even without color information for at least the portion of the image in the selected at least one layer, from among the managed plurality of layers based on user's selection to execute the automatic colorization with respect to the selected at least one layer;
  synthesizing a resultant layer of the automatic colorization and at least one layer of the managed plurality of layers; and
  displaying a result of the synthesizing on a display device.

16. The method according to claim 15, further comprising:
  displaying a user interface for allowing a user to give hint information about the automatic colorization with respect to the selected at least one layer,
  wherein the automatic colorization with respect to the selected at least one layer is executed based on the hint information given by the user through the user interface.

17. The method according to claim 16, further comprising:
  establishing, as the hint information given through the displayed user interface, correspondence between a color selected by the user and a portion that is designated by the user as a portion to be colorized with the selected color, with respect to the selected at least one layer.

18. The method according to claim 17, wherein the establishing comprises establishing the correspondence by placing, through the displayed user interface, a dot on the portion that is to be colorized with the selected color.

19. The method according to claim 15, wherein
  the managed plurality of layers include a background layer, and
  the at least one layer of the managed plurality of layers is a layer superimposed on the background layer.

20. The method according to claim 15, wherein the automatic colorization is executed based on a colorization model including a neural network.

21. A non-transitory computer readable medium storing an editing software configured to cause at least one processor to:
  manage a plurality of layers overlapping each other, at least one of the plurality of layers including image data;
  identify at least one layer at least a portion of which is to be subject to an automatic colorization colorizing at least a portion of an image in the at least one layer even without color information for at least the portion of the image in the at least one layer, from among the managed plurality of layers based on user's selection as a layer that is subject to the automatic colorization; and
  display an image on a display device, based on at least (i) a resultant layer of the automatic colorization executed with respect to the identified at least one layer, and (ii) another layer of the managed plurality of layers that is not subject to the automatic colorization.

22. The non-transitory computer readable medium according to claim 21, wherein the editing software is further configured to cause the at least one processor to execute the automatic colorization with respect to the identified at least one layer.

23. The non-transitory computer readable medium according to claim 21, wherein the editing software is further configured to cause the at least one processor to synthesize at least (i) the resultant layer of the automatic colorization and (ii) the another layer that is not subject to the automatic colorization, into the image to be displayed on the display device.

24. The non-transitory computer readable medium according to claim 21, wherein the resultant layer of the automatic colorization includes a portion that has been colorized and a portion that has not been colorized.

25. The non-transitory computer readable medium according to claim 21, wherein the editing software is further configured to cause the at least one processor to:
  display a user interface for allowing the user to give hint information about the automatic colorization with respect to the identified at least one layer; and
  execute the automatic colorization with respect to the identified at least one layer based on the given hint information.

26. The non-transitory computer readable medium according to claim 25, wherein the hint information is information that provides correspondence between a color selected by the user and a portion that is designated by the user as a portion to be colorized with the selected color, with respect to the identified at least one layer.

27. The non-transitory computer readable medium according to claim 26, wherein the user interface establishes the correspondence by allowing the user to place a dot on the portion that is to be colorized with the selected color.

28. The non-transitory computer readable medium according to claim 21, wherein the editing software is further configured to cause the at least one processor to provide an editing function of editing a result of executing the automatic colorization.

29. The non-transitory computer readable medium according to claim 21, wherein the identified at least one layer is a managed layer that has an image that has been generated or pasted using the editing software.

30. The non-transitory computer readable medium according to claim 21, wherein the at least one processor is configured to execute the automatic colorization based on a trained neural network that has been trained to perform colorization processing on image data.

31. An apparatus comprising:
  at least one memory;
  at least one processor configured to:
  manage a plurality of layers overlapping each other, at least one of the plurality of layers including image data;
  identify at least one layer at least a portion of which is to be subject to an automatic colorization colorizing at least a portion of an image in the at least one layer even without color information for at least the portion of the image in the at least one layer, from among the managed plurality of layers based on user's selection as a layer that is subject to the automatic colorization; and
  display an image on a display device, based on at least (i) a resultant layer of the automatic colorization executed with respect to the identified at least one layer, and (ii) another managed layer not subject to the automatic colorization.

32. The apparatus according to claim 31, wherein the at least one processor is further configured to execute the automatic colorization with respect to the identified at least one layer.

33. The apparatus according to claim 31, wherein the at least one processor is further configured to synthesize at least (i) the resultant layer of the automatic colorization and (ii) the another layer that is not subject to the automatic colorization, into the image to be displayed on the display device.

34. The apparatus according to claim 31, wherein the resultant layer of the automatic colorization includes a portion that has been colorized and a portion that has not been colorized.

35. The apparatus according to claim 31, wherein the at least one processor is configured to:
    display a user interface for allowing the user to give hint information about the automatic colorization with respect to the identified at least one layer; and
    execute the automatic colorization with respect to the identified at least one layer based on the given hint information.

36. The apparatus according to claim 35, wherein the hint information is information that provides correspondence between a color selected by the user and a portion that is designated by the user as a portion to be colorized with the selected color, with respect to the identified at least one layer.

37. The apparatus according to claim 36, wherein the user interface establishes the correspondence by allowing the user to place a dot on the portion that is to be colorized with the selected color.

38. The apparatus according to claim 31, wherein the at least one processor is configured to provide an image editing function of editing a result of executing the automatic colorization.

39. The apparatus according to claim 31, wherein the identified at least one layer is a managed layer that has an image that has been generated or pasted using an image editing function provided by the at least one processor.

40. The apparatus according to claim 31, wherein the at least one processor is configured to execute the automatic colorization based on a trained neural network that has been trained to perform colorization processing on image data.

41. A method comprising:
    managing a plurality of layers including one or more images;
    performing an automatic colorization with respect to at least a first layer that is selected by a user, as a layer at least a portion of which is to be subject to the automatic colorization colorizing at least a portion of an image in the selected first layer even without color information for at least the portion of the image in the selected first layer, from among the managed plurality of layers;
    synthesizing at least a resultant layer of the automatic colorization and a second layer that is among the managed plurality of layers and is not subject to the automatic colorization, into a synthesized colored image; and
    displaying the synthesized colored image on a display device.

42. The method according to claim 41, wherein the resultant layer of the automatic colorization includes a portion that has been colorized and a portion that has not been colorized.

43. The method according to claim 41, further comprising:
    displaying, on the display device, a user interface for allowing the user to give hint information about the automatic colorization for the first layer selected by the user, and
    performing the automatic colorization with respect to the first layer selected by the user, based on the hint information given by the user through the user interface.

44. The method according to claim 43, wherein the hint information is information that provides correspondence between a color selected by the user and a portion that is designated by the user as a portion to be colorized with the selected color, with respect to the first layer selected by the user.

45. The method according to claim 44, further comprising:
    establishing, by the user interface, the correspondence by allowing the user to place a dot on the portion to be colorized with the selected color.

46. The method according to claim 41, further comprising:
    performing the automatic colorization by performing an automatic colorization with respect to a user selected region; and
    refraining from performing an automatic colorization with respect to other regions, in the first layer selected by the user.

47. The method according to claim 41, wherein the managed plurality of layers include a background layer, and the first layer selected by the user is a layer superimposed on the background layer.

48. The method according to claim 47, wherein the layer superimposed on the background layer is a layer of a person.

49. The method according to claim 41, further comprising:
    performing another automatic colorization with respect to the second layer in addition to the first layer selected by the user.

50. The method according to claim 49, further comprising:
    synthesizing at least resultant layers of the automatic colorization and the second layer of the another automatic colorization into the synthesized colored image.

51. The method according to claim 41, further comprising:
    performing the automatic colorization based on a colorization model.

52. The method according to claim 51, wherein the colorization model includes a neural network.

53. The method according to claim 41, further comprising:
    receiving a color and a position for target image data of the first layer selected by the user, the color and the position for the target image data being selected by the user as a hint for the automatic colorization of the target image data.

54. A non-transitory computer readable medium storing an editing software configured to cause at least one processor to:
    manage a plurality of layers including one or more images;
    perform an automatic colorization with respect to at least a first layer that is selected by a user, as a selected layer at least a portion of which is to be subject to the automatic colorization colorizing at least a portion of an image in the selected layer even without color information for at least the portion of the image in the selected layer, from among the managed plurality of layers;
    synthesize at least a resultant layer of the automatic colorization and a second layer that is among the managed plurality of layers and is not subject to the automatic colorization, into a synthesized colored image; and display the synthesized colored image on a display device.

55. The non-transitory computer readable medium according to claim 54, wherein the resultant layer of the automatic colorization includes a portion that has been colorized and a portion that has not been colorized.

56. The non-transitory computer readable medium according to claim 54, wherein the editing software is further configured to cause the at least one processor to:

display, on the display device, a user interface for allowing the user to give hint information about the automatic colorization for the first layer selected by the user, and perform the automatic colorization with respect to the first layer selected by the user, based on the hint information given by the user through the user interface.

57. The non-transitory computer readable medium according to claim 56, wherein the hint information is information that provides correspondence between a color selected by the user and a portion that is designated by the user as a portion to be colorized with the selected color, with respect to the first layer selected by the user.

58. The non-transitory computer readable medium according to claim 57, wherein the editing software is further configured to cause the at least one processor to:

establishing, through the user interface, the correspondence by allowing the user to place a dot on the portion to be colorized with the selected color.

59. The non-transitory computer readable medium according to claim 54, wherein the editing software is further configured to cause the at least one processor to:

perform the automatic colorization by performing an automatic colorization with respect to a user selected region; and refrain from performing an automatic colorization with respect to other regions, in the first layer selected by the user.

60. The non-transitory computer readable medium according to claim 54, wherein the managed plurality of layers include a background layer, and the first layer selected by the user is a layer superimposed on the background layer.

61. The non-transitory computer readable medium according to claim 60, wherein the layer superimposed on the background layer is a layer of a person.

62. The non-transitory computer readable medium according to claim 54, wherein the editing software is further configured to cause the at least one processor to:

perform another automatic colorization with respect to the second layer in addition to the first layer selected by the user.

63. The non-transitory computer readable medium according to claim 62, wherein the editing software is further configured to cause the at least one processor to:

synthesize at least resultant layers of the automatic colorization and the second layer of the another automatic colorization into the synthesized colored image.

64. The non-transitory computer readable medium according to claim 54, wherein the editing software is further configured to cause the at least one processor to:

perform the automatic colorization based on a colorization model.

65. The non-transitory computer readable medium according to claim 54, wherein the colorization model includes a neural network.

66. The non-transitory computer readable medium according to claim 54, wherein the editing software is further configured to cause the at least one processor to:

receive a color and a position for target image data of the first layer selected by the user, the color and the position for the target image data being selected by the user as a hint for the automatic colorization of the target image data.

* * * * *